United States Patent [19]

Conkling

[11] Patent Number: 4,466,365
[45] Date of Patent: Aug. 21, 1984

[54] MANUALLY MANIPULATED AGRICULTURAL IMPLEMENT WITH SEED ENCLOSURE HAVING TOOTH MEMBERS EXTENDING OUT OF HOLES IN THE ENCLOSURE

[76] Inventor: William C. Conkling, 50 Wootton Rd., Essex Fells, N.J. 07021

[21] Appl. No.: 380,477

[22] Filed: May 20, 1982

[51] Int. Cl.³ .............................................. A01C 7/02
[52] U.S. Cl. .......................................... 111/72; 7/114; 56/400.15; 172/360; 172/378
[58] Field of Search ............... 172/21, 22, 122, 349, 172/350, 354, 371, 375, 378, 438, 544, 554; 111/34, 50, 72, 74, 75, 76, 77, 78, 79, 82, 92, 93, 94, 95, 96, 97, 98, 99; 7/114, 115, 116; 56/400.04, 400.05, 400.06, 400.07, 400.08

[56] References Cited

U.S. PATENT DOCUMENTS

| | | | |
|---|---|---|---|
| 133,709 | 12/1872 | Jones | 172/375 UX |
| 1,272,550 | 7/1918 | Smith | 111/74 |
| 1,430,614 | 10/1922 | Bauer | 111/74 |
| 1,665,042 | 4/1928 | Richards | 111/74 |
| 1,757,511 | 5/1930 | Brewer | 172/544 |
| 1,878,853 | 9/1932 | Hubbard | 111/74 |
| 2,048,201 | 7/1936 | Short | 172/350 |
| 2,236,129 | 3/1941 | Baker | 56/400.17 X |
| 4,011,612 | 3/1977 | Atkinson | 7/116 |

Primary Examiner—Richard T. Stouffer
Attorney, Agent, or Firm—Anthony F. Cuoco

[57] ABSTRACT

A manually operated tool for simultaneously preparing a seed bed, feeding seed and dispersing the seed uniformly in the bed consists of a rake-like structure, the head of which is integrated with an appendage bearing enclosure for containing a supply of seed and for cooperating with the rake-like structure when manipulated to cause controlled scarifying of the ground and efficient and controlled feeding and dispersing of the seed.

8 Claims, 5 Drawing Figures

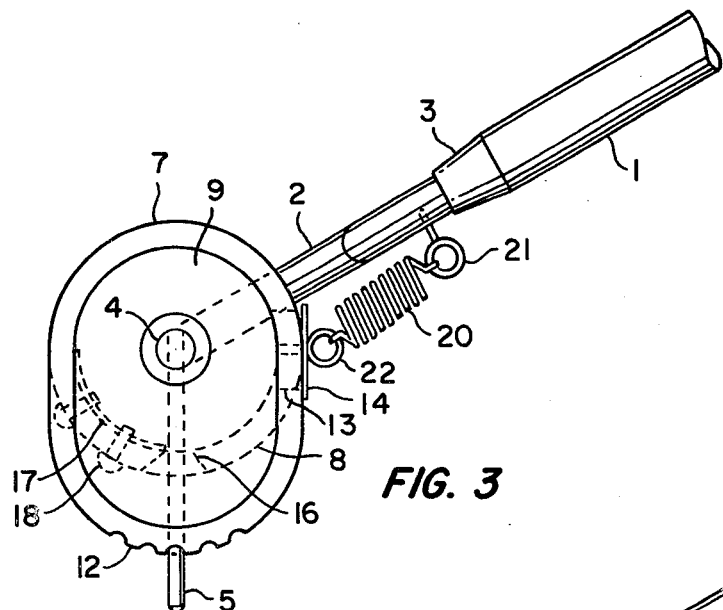
FIG. 3
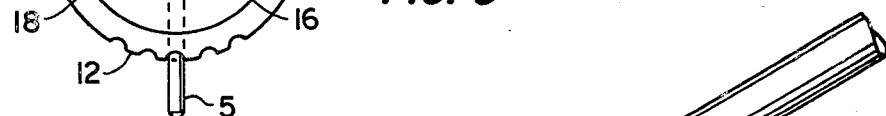
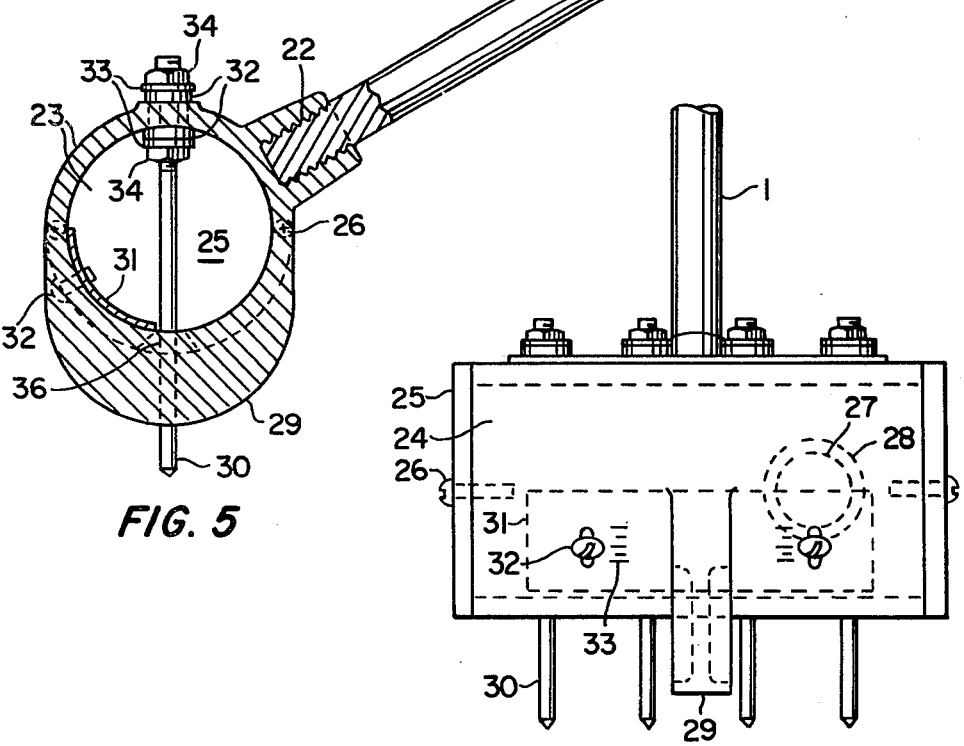
FIG. 5
FIG. 4

4,466,365

MANUALLY MANIPULATED AGRICULTURAL IMPLEMENT WITH SEED ENCLOSURE HAVING TOOTH MEMBERS EXTENDING OUT OF HOLES IN THE ENCLOSURE

BACKGROUND OF THE INVENTION

The invention relates to the establishing, thickening and repairing of growing surfaces, primarily lawn surfaces of the type nurtured by broadcasting particulate seed over a prepared seed bed.

In many areas where lawns are a desirable accessory to development and pleasant surroundings new lawns must be established. Older lawns are likely to be subjected to hard wear, extremes of sunlight, drought, insect attack and the like thereby causing areas of infestation, thinning and failure.

The object of this invention is to provide an inexpensive easy-to-use tool that will enable the lawn owner or his gardener to readily make spot repairs and to establish new areas with minimum expenditure of time and energy.

It is well known that a proper seed bed for most commonly used lawn seed consists of soil loosened to one half inch or so in depth. Dirt clumps in the bed ranging from one eighth inch to one and one half inches in diameter are ideal. Dispersal of the seed in the cracks and crevices of such a bed protects the seed and sprouts from drying due to the wind and sun and provides them with optimum opportunity for growth.

Tools such as garden forks, rakes and hatchets are commonly used to prepare seed beds. Seed is commonly broadcast by hand after preparation of the bed. The above tools not being designed specifically for the task tend to rip out good grass, prepare too deep and to be generally awkward. Broadcasting of the seed is a separate operation and likely to be imprecise. The entire operation is laborious and unreliable.

The object of the invention is a tool that will simultaneously provide an optimum seed bed and to provide thorough and efficient dispersal of the seed within the bed in a single operation with a minimum of effort.

SUMMARY OF THE INVENTION

All embodiments of the tool of this invention have a similarity to a simple garden rake in their structure and in their use. There is the equivalent handle, rake head and rake teeth. Normal operation involves manually applying forward and backward (or simply backward) rake-like strokes to the tool and thereby to the ground being treated. A chopping action to break up lumps of earth and to apply additional seed is also useful. The top side of the head structure may be used for breaking lumps and for smoothing and tamping the earth upon rotating the handle 180° in the operators hands. The working attitude is similar to that of a rake.

The tool, however, provides additional functions and is more complex than a rake. In its construction a generally cylindrical enclosure surrounds most of the head (or substitutes for the head) and partially encloses rod-like teeth. The enclosure provides a storage chamber for the grass seed to be sown. A filling port and a filling port closure are included to permit replenishment of the storage chamber with seed. The lower end of the teeth project through oblong clearance holes in the bottom wall of the enclosure. The construction and operation are such that oscillatory motion is generated between the clearance holes of the enclosure and the teeth. This oscillation is facilitated in the preferred embodiment by bearing holes in the enclosure that engage the head frame of the rake thereby enabling the enclosure to rotate on the head frame and to oscillate freely about the teeth within the limits of the clearance holes. In an alternate embodiment, relative oscillation is facilitated by the flexible mountings of the upper ends of the teeth in the top wall of the enclosure thereby permitting oscillation due to lateral flexing of the teeth within the limits of the clearance of the teeth in the clearance holes.

The feeding of seed takes place as hereafter described along the teeth and through the clearance holes through which the teeth project.

Control and rate of feeding depend importantly on tooth diameter and clearance hole size both of which have been optimized through experiment. Further, the size of the clearance holes has been made adjustable.

The enclosure cooperates through its action with the teeth to agitate the seed supply in the enclosure and to urge or feed the seed out of the enclosure at a regulated rate when the tool is being stroked in the working mode. It also cooperates to restrict flow when not being stroked in the working mode. In the latter case, the tool is potentially susceptable to wasteful leakage of seed when the tool is in its working attitude but not being stroked through the soil. In the absence of vigorous motion, jarring or relative motion between the teeth and the enclosure (normally imparted by working strokes), the seeds of the seed supply tend to lodge broad-side over the open portion of the clearance holes and not drop through. Uncontrolled flow of seed is thereby effectively avoided. However, when by virtue of applying work strokes motion is imparted to the teeth relative to the reservoir of seed and relative to the clearance holes the agitation of the seed in the vicinity of the teeth and holes causes upending of the seed and a momentary flow of seed downwardly along the teeth and through the holes to the soil beneath.

As indicated, seed feed regulation depends largely on the size of the teeth and the clearance holes relative to the seed size. To permit the adjustment of this function the net clearance of the holes is large enough for the largest seeds and the highest anticipated flow needs. A simple adjustable plate is provided that can be positioned and secured so that it partially overlaps the ends of the clearance holes such that it effectively alters hole size. Proper positioning is obtained by trial and error and through experience.

Another feature of the enclosure is the incorporation of one or two bluff appendages fixed to the enclosure and projecting from the enclosure in substantially the same direction as the teeth but to lesser distance than the teeth from the main structure. The appendages act to limit the depth of scarifying by the teeth to an optimum depth since they are too bluff to penetrate the ground and thus simply slide over the ground thereby acting to gage tooth penetration. A second function of the bluff appendages is to space the enclosure proper and thereby the clearance holes in the enclosure above the ground. Such spacing above the ground helps prevent wetting of the clearance hole bores and the stored seed by wet soil and wet organic matter. Mud and wetness in the clearance hole areas tend to cause fouling due to swelling of the seed and plastering of mud over the holes thus interferring with seed flow. In the preferred embodiments the appendages have a third function, i. e., to cause the necessary rocking motion of the enclosure by virtue of ground drag on the appendages.

BRIEF DESCRIPTION OF DRAWINGS

FIG. 3 is a side elevation view of the preferred embodiment with modified mechanism looking from the right side of FIG. 1.

FIG. 4 is a front view of the alternate embodiment.

FIG. 5 is a sectioned side elevation of the alternate embodiment looking from the right side of FIG. 4.

DETAILED DESCRIPTION

Figure 1:
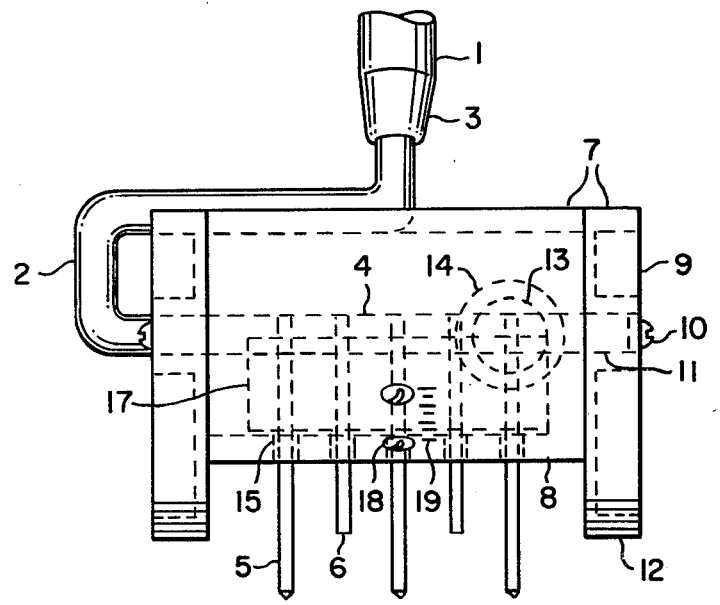
FIG. 1 is a front elevation view of the preferred embodiment.
Figure 2:
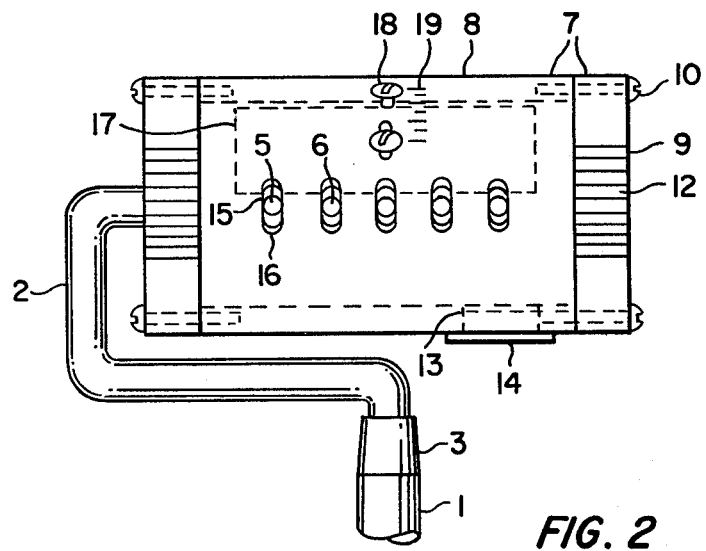
FIG. 2 is a bottom view of the preferred embodiment.

Referring to FIGS. 1,2, the preferred structure comprises a conventional wooden handle 1 rigidly secured to a metal cross-head frame 2 with the aid of metal ferrule 3 to reinforce the wood to metal joint. The outboard end of the metal cross-head frame 2 consists of an axle-like member, the cross-head bar 4, typically ½ inch in diameter, that serves to support the balance of the tool. One or more, typically three, pointed long teeth 5 are secured to the cross-head bar 4 and oriented perpendicularly to the cross-head bar 4 at the root ends of the long teeth 5. Their angle of orientation with the inclined plane of the handle 1 is conveniently in the range of 90° to 135°. The long teeth 5 are preferably of hardened steel and typically 3/16 inch in diameter and 1½ inches apart. A preferred joint construction between the long teeth 5 and the cross-head bar 4 is of the force fit or interference type. A series of unpointed short teeth 6, typically two in number, are similarly secured and uniformly interspersed with the long teeth 5 on the cross-head bar 4 in line with the long teeth 5. The preferred material, diameter and joint are the same as for the long teeth 5.

An enclosure 7, typically cylindrical in configuration, consists of a main body part 8, typically 3 to 4 inches in diameter and 4 to 6 inches in length and two end plates 9. These parts are preferably manufactured from plastics for lightness and low cost. Kralastic, PVC, lucite and polycarbonate are commonly available plastics of suitable physical characteristics. Preferably at least one of these parts is of the transparent plastics to enable visual inspection of the inside of the enclosure 7. The end plates 9 are secured to the main body 8 by two or more cap screws 10 through the end plates 9 into tappings in the main body 8.

The end plates 9 are flanged and contain bearing holes 11 slightly larger than the diameter of the cross-head bar 4 placed to correspond in location with the axis of the main body 8. The bearing holes 11 engage the cross-head bar 4 in a rotative manner. The end plates 9 are oblong in configuration, one lobe projecting downwardly from the main body 8, typically 1 inch, to form a bluff appendage 12. The width of the lower flanges of the bluff appendages 12 are typically 1 inch and incorporate a corrugated bottom surface to provide a gripping action with the dirt and lawn surfaces which they contact in use. The long teeth 5 are sized to extend approximately ½ inch below the appendages 12 while the short teeth 6 are sized to be substantially the same length as the appendages 12.

The main body 8 incorporates a filling hole 13 with a suitable friction closure 14. It also includes oblong clearance holes 15 corresponding in number and position to the intersecting perpendicularly oriented teeth 5,6. The dimensions of the oblong clearance holes 15 are typically 1/64 inch larger than the tooth diameters on their minor axes and two or three time the diameter of the teeth 5,6 on their major axes. The major axes are circumferentially oriented in the main body part 8. The ends of the oblong clearance holes 15 are provided with a chamfer 16 of approximately 45° flaring outwardly from the main body part 8 to improve seed flow.

A plate 17 that conforms in shape to the inside of the main body part 8 and uniformly overlaps the clearance holes 15 to an adjustable degree is secured by two cap screws 18 to the main body part 8. The screws 18 engage tappings in the plate 17 and a slot in the main body part 8 permitting adjustment of the overlap of the plate 17 with respect to the clearance holes 15. Graduations molded to the main body part 8 adjacent to the cap screws 18 assist with the adjustment of the plate 17.

FIG. 3 illustrating a modified mechanism discloses the addition of a tension spring 20, typically tensed from 2 to 5 pounds of force, attatched to a screw eye 21 secured to the cross-head frame 2 at one end in the proximity of its junction with the handle 1 to a screw eye 22 secured to the enclosure 7 at its other end. The location of the screw eyes 21, 22 are such that the tension spring 20 tends to urge the bottom of the enclosure in the direction of the handle and against the teeth 5,6. Oscillation of the enclosure 7 about the teeth 5,6 is accomplished in this arrangement by dragging the bluff appendages on the pull strokes and by lifting the tool free of the ground for the return strokes. The drag overcomes the spring bias to cause motion in one direction while relief of drag permits return action.

Referring to FIGS. 4,5 an alternate embodiment comprises a wooden handle 37 rigidly secured in the socket 22 of the enclosure 23. The enclosure 23, typically cylindrical in configuration, consists of a main body part 24 and two end plates 25. These parts are preferably manufactured from plastics for lightness and low cost. Kralastic, PVC, lucite and polycarbonate are commonly available plastics of suitable physical characteristics. Preferably at least one of the parts is of the transparent plastics to enable visual inspection of the inside of the enclosure 23. The end plates 25 are secured to the main body 24 by two or more cap screws 26 through the end plates 25 into tappings in the main body 24.

The main body 24 incorporates a filling hole 27 and a suitable friction closure 28 and one (or more) bluff appendages 29. The bluff appendage 29 is crescent in configuration and projects downwardly from the main body 23, typically 1 inch below the main body part 24. The width of the lower flanged edge of the bluff appendage 29 is typically 1 inch.

Two or more, typically four, pointed teeth 30 are flexibly secured by their upper threaded ends in oversized holes in substantially perpendicular orientation to the top wall. Their orientation with the inclined plane of the handle 37 is conveniently in the range of from 90° to 135°. Each tooth is secured to the main body part 24 wall by a sandwiched joint consisting of the main body part 24 wall, two rubber washers 32 on each side of the wall, two metal washers 33 on each side of the wall and against the rubber washers 33 and two nuts 34 secured against the metel washers 33 by means of threads on the teeth 30. The teeth 30 are preferably of hardened steel, typically 3/16 inches in diameter, spaced typically 1½ inches apart and of length that causes them to project, typically, ½ inch below the bluff appendage 29.

The main body part 24 includes oblong clearance holes 36 in the bottom wall of the main body part 24 corresponding in number and position to the intersecting perpendicularly oriented teeth 30. The dimensions of the oblong clearance holes 36 are, typically, 1/64 inch larger on their minor axes than the diameter of the teeth 30 and two or three times the diameter of the teeth 30 on their major aces. The major axes are circumferentially oriented in the main body part 24. The ends of the oblong clearance holes 36 are provided with a chamfer of approvimately 45° flaring outwardly from the main body part 24 to improve the seed flow.

The attachments of the teeth 30 to the top of the main body part 24, by virtue of their materials and geometry, provide high resistivity to axial forces on the teeth 30 but provide minor resistance to lateral forces at the outboard ends of the teeth 30. Desirable axial tooth resistance along with ease of tooth oscillation in the oblong clearance holes is thereby attained in response to rake- like stroking of the tool over the earth by an operator.

In a construction similar to the preferred embodiment, the alternate embodiment includes a plate 31 with clamping screws referenced in their positions to the graduations 33.

In the preferred embodiment the lateral resistive force transmitted to the bluff appendages and to the enclosure as the tool is stroked back and forth over the ground translates into a rocking or oscillatory action relative to the teeth that provides the desired seed agitation and regulated seed feed. In the alternate embodiment, equivalent action is obtained as a result of lateral resistive force on the flexibly mounted teeth as the teeth are stroked through the earth.

In the preferred embodiment, in operation, the open ends of the oblong clearance holes are generally exposed to the open furrows plowed out by the teeth in the soil with the result that a substantial percentage of the seed falls into the furrows. Seed that misses the furrows finds cracks and crevices as the work area is stroked and churned.

In the preferred embodiment with the modified mechanism, a tension spring retracts the enclosure in one direction such that the oblong clearance holes impact the sides of the teeth on the side away from the operator. The operator can then use a series of pulling working strokes and elevated non-working return strokes. The effect on seed feed and placement is substantially the same as for the apparatus of the preferred embodiment without the spring.

In the alternate embodiment of the tool, the oscillation of the teeth in the oblong clearance holes results from the flexing of the teeth at their flexible attachments at the top of the enclosure. This occurs in the process of the tooth-like members being urged through the soil by the force of the operator on the handle and thereby on the enclosure. The teeth flex forward and backward in the clearance holes with backward and forward strokes. In this embodiment the open ends of the oblong clearance holes are exposed to the side of the teeth opposite the furrow side during working strokes thereby not being presented with an open furrow. However, since much of the feeding of the seed occurs upon stroke reversal some of the seed does find the furrows. Seed that does not find the furrows finds cracks and crevices as the work area is stroked and churned.

Two lengths of teeth have been found to be useful in the preferred embodiment. The longer teeth extending below the the bluff appendages scarify or plow the soil. The shorter teeth serve to break up lumps and to level the dirt. In the alternate embodiment the shorter teeth are not as effective in terms of feeding seed and have, therefore, not be included.

It has been found that the tool works satisfactorily with a mixture of seeds varying in size and that fertilizer can be mixed with the seed prior to loading the enclosure and fed with the seed with thorough and efficient results.

Although this invention has been described in considerable detail with respect to certain embodiments it should be understood that such embodiments are for purposes of illustration only and do not limit the scope of the invention.

I claim:

1. An agricultural implement, comprising:
    enclosure means including a seed filling opening and a plurality of holes for the outward passage of the seed;
    tooth member means including a corresponding plurality of tooth members substantially smaller in diameter than the diameter of the holes, said tooth members oriented so that ones of their ends extend inside the enclosure means and the others of their ends project external to the enclosure means through corresponding holes;
    mechanism means intermediate the enclosure means and the tooth member means, said mechanism means coupled to the tooth members near the ones of the ends and coupled to the enclosure means, and arranged to restrain axial displacement and to enable lateral displacement of the tooth members relative to the holes in response to differential forces externally applied to the enclosure means and the tooth member means;
    an enlongated handle rigidly coupled at one end to one of the enclosure means, the mechanism means and the tooth member means for manual manipulation of the implement;
    each of the plurality of holes of the enclosure means being oblong with major and minor axes, the minor axes being normal to an imaginary vertical plane containing the handle and being longer than the corresponding dimension of the tooth members, the major axes being parallel to said imaginary plane and being longer than the corresponding dimension of the tooth members; and
    a movable plate secured to the enclosure and overlapping the plurality of holes of the enclosure means, whereby the lengths of the major axes are adjustable.

2. An argricultural implement as described by claim 1, including:
    a plurality of appendages secured to the enclosure means and projecting therefrom substantially parallel to the others of the ends of the tooth members in degree to a lesser distance from said enclosure means than at least a portion of said tooth members.

3. An agricultural implement as described by claim 1, wherein:
    the mechanism means includes an axle intermediate the tooth member means and the enclosure means, said axle being rigidly coupled to said tooth member means and rotatably coupled to said enclosure means.

4. An agricultural implement as described by claim 3, including:

a longitudinally biased resilient member having one end thereof secured to the handle and the opposite end thereof secured to the enclosure means at a point on said enclosure means such that the line of action of the resilient member is offset from the axis of the axle.

5. An agricultural implement as described by claim 3, wherein:

the one end of the elongated handle is rigidly coupled to the tooth member means.

6. An agricultural implement as described by claim 1, wherein:

the one end of the elongated handle is rigidly coupled to the enclosure means.

7. An agricultural implement as described by claim 1, wherein:

the one end of the elongated handle is rigidly coupled to the mechanism means.

8. An agricultural implement as described by claim 1, wherein:

the one end of the elongated handle is rigidly coupled to the tooth member means.

* * * * *